United States Patent [19]

Pratt

[11] Patent Number: 5,273,342
[45] Date of Patent: Dec. 28, 1993

[54] DETACHABLE HEADREST FOR AIRCRAFT

[76] Inventor: Charles W. Pratt, P.O. Box 993, Poulsbo, Wash. 98370

[21] Appl. No.: 908,213

[22] Filed: Jul. 2, 1992

[51] Int. Cl.5 ............................................. A47C 7/38
[52] U.S. Cl. .................................... 297/397; 297/391; 297/399
[58] Field of Search ............... 297/391, 397, 399, 400, 297/404, 230, 231

[56] References Cited

U.S. PATENT DOCUMENTS

| | | |
|---|---|---|
| 103,631 | 5/1870 | Littlehage . |
| 131,816 | 10/1872 | Fabrici . |
| 305,428 | 9/1884 | Covert . |
| 471,049 | 3/1892 | Barth . |
| 1,565,514 | 12/1925 | Schumacher . |
| 1,565,730 | 12/1925 | Gilmour . |
| 2,001,396 | 5/1935 | Pumphrey . |
| 2,020,573 | 11/1935 | Pumphrey . |
| 2,553,385 | 5/1951 | Ruth . |
| 2,573,186 | 10/1951 | De Mier, Sr. . |
| 2,622,660 | 12/1952 | Stratton . |
| 2,756,808 | 7/1956 | Eichorst . |
| 2,897,878 | 8/1959 | Mungovan . |
| 3,046,057 | 7/1962 | Suetko ........................ 297/397 |
| 3,173,721 | 3/1965 | Kinsman ..................... 297/404 X |
| 3,197,255 | 7/1965 | Caudill ....................... 297/231 X |
| 3,387,886 | 6/1968 | Longo et al. ............... 297/399 X |
| 3,528,703 | 9/1970 | Ohta ............................ 297/391 |
| 3,650,561 | 3/1972 | Faust et al. ................. 297/391 |
| 4,991,907 | 2/1991 | Tanaka ....................... 297/404 X |

FOREIGN PATENT DOCUMENTS

| | | |
|---|---|---|
| 1427740 | 11/1964 | France . |
| 1425212 | 2/1965 | France . |
| 1490939 | 8/1966 | France . |
| 2421753 | 12/1979 | France ........................ 297/400 |

Primary Examiner—Peter R. Brown
Attorney, Agent, or Firm—Christensen, O'Connor, Johnson & Kindness

[57] ABSTRACT

A detachable headrest (10) for removable installation on a seat back (12) includes a frame (16) having a base member (18) for contacting the seat back and a collapsible, resilient upper member (20) projecting upwardly from the base member above the seat back. A cushion (22) is mounted on and supported by the upper member of the frame. Channel brackets (25) are secured to the underside of the base member and grip the top of the seat back. A flap (46) of fabric extends downwardly from the anterior face of the cushion and covers a portion the seat back so that a person leaning against the flap secures the detachable headrest in position.

12 Claims, 3 Drawing Sheets

DETACHABLE HEADREST FOR AIRCRAFT

FIELD OF THE INVENTION

The present invention relates to detachable headrests for seat backs, and more particularly, to detachable headrests for aircraft seat backs.

BACKGROUND OF THE INVENTION

Conventional reclining chairs and seats designed for residential, business, and vehicle use often have seat backs that are too short to support the head of tall individuals. Upon reclining, the individual's head tends to cock rearwardly over the seat back, rather than being supported by the seat back's anterior face. Conventional reclining seats can thus be quite uncomfortable, particularly for tall passengers on commercial airlines who are required to sit in a stationary position for long periods of time.

Various detachable headrests have been designed for mounting to the top of seat backs in order to provide greater support for the head of individuals who are taller than the seat will accommodate. However, known detachable headrests have not found wide acceptance in the aircraft industry. Reasons for this may include the bulkiness of the headrest, the difficulty and/or expense of securing the headrest in place, and safety concerns associated with the headrest.

For example, detachable headrests disclosed by U.S. Pat. Nos. 2,020,573 and 2,001,396 to Pumphrey; 1,565,514 to Schumacher; and 471,049 to Barth all include wire or metal rods that extend upwardly above the height of the seat back to form the headrest frame. Such conventional headrests present a saftey hazard in an aircraft environment, due to the likelihood that an attendant or passenger may be thrown off balance and fall onto the headrest. The upwardly-projecting rigid frame portions could result in severe injury in such circumstances.

Additionally, conventional headrests are typically difficult or costly to install on seat backs. For example, the headrest disclosed by Pumphrey U.S. Pat. No. 2,020,573 requires the placement of sockets secured to the seat back that receives downward-projecting frame members. A cloth flap extending downwardly from the headrest over the anterior of the seat back also aids to secure the headrest in place, but most of the load is taken by the frame members engaged in the seat sockets. Installation of the sockets on each seat within an aircraft would be prohibitively expensive.

Conventional headrests are also often relatively large due to the required mounting hardware included therewith and thus require large storage volume. Pumphrey U.S. Pat. No. 2,001,396, Barth U.S. Pat. No. 471,049, U.S. Pat. No. 2,897,878 to Mungovan, and U.S. Pat. No. 2,622,660 to Stratton each disclose headrests including frame members that extend downwardly on either side of the seat back to secure the seat back in position. These projecting frame members increase the headrest length, and thus the storage volume required. Also, the projecting frame members could potentially result in injury to passengers during installation and removal.

Other conventional headrests have relatively short clamps that grasp the upper edge of the seat back, such as those disclosed by U.S. Pat. Nos. 2,553,385 to Ruth and 2,573,186 to DeMier Sr. Because of the absence of long extending frame portions, these headrests are somewhat easier to store. However, they are relatively unstable for an aircraft environment, and each includes a cushioned portion that projects forwardly of the anterior face of the seat back, thus causing the user's head to tip forward.

In summary, although many detachable headrests have been designed as disclosed in the prior art discussed above, none have proven satisfactory for regular commercial use in aircraft.

SUMMARY OF THE INVENTION

The present invention provides a detachable headrest for removable installation on a seat back, the seat back having an anterior side and a posterior side. The headrest includes a frame having a base portion for contacting the seat back and a collapsible, resilient upper portion projecting upwardly from the base portion above the seat back. The headrest also includes a cushion, mounted on and supported by the upper portion of the frame, that defines an anterior face upon which a person's head rests. The headrest further includes a securement mechanism for detachably securing the base portion of the frame to the seat back.

In a preferred embodiment of the present invention, the upper portion of the headrest frame is formed as a contoured sheet of semi-rigid material having an upright center web section, and a pair of wing sections projecting transversely downwardly from the ends of the center web section. The wing sections provide enough lateral stability that the upper portion of the frame does not yield against the weight of the user's head. However, the upper portion of the frame will collapse under compressive loads from above, such as when a person falls on top of the headrest.

In a further aspect of the present invention, the headrest includes at least one set of spaced-apart first and second flanges depending downwardly from the base portion of the frame for gripping the anterior and posterior sides, respectively, of the upper edge of the seat back, and thereby mounting the headrest to the seat back. A flap of fabric depends downwardly from the anterior face of the headrest cushion, to cover the anterior face of the seat back sufficiently that a person reclining against the headrest leans against the flap, thereby preventing slidable movement of the fabric flap relative to the seat back. The fabric flap thus serves to prevent the headrest from being pushed rearwardly off of the seat back.

The present invention provides a detachable headrest that is ideally suited for quick and easy mounting on a seat back, such as seats within aircraft. A relatively small number of headrests may be stored within a large commercial aircraft, and then installed on the backs of particular seats on an as-needed basis. The collapsible construction of the headrest prevents passengers and attendants from being injured should they fall upon the headrest. The combination of the gripping flanges and the fabric flap securely mount the headrest on the seat back without requiring special adaption of the seat backs or cumbersome effort, and the headrest is compact so that it can be readily stored in a small space.

BRIEF DESCRIPTION OF THE DRAWINGS

The present invention will be better understood in view of the detailed description following, when taken in conjunction with the appended drawings, in which.

DETAILED DESCRIPTION OF THE PREFERRED EMBODIMENT

Figure 1:
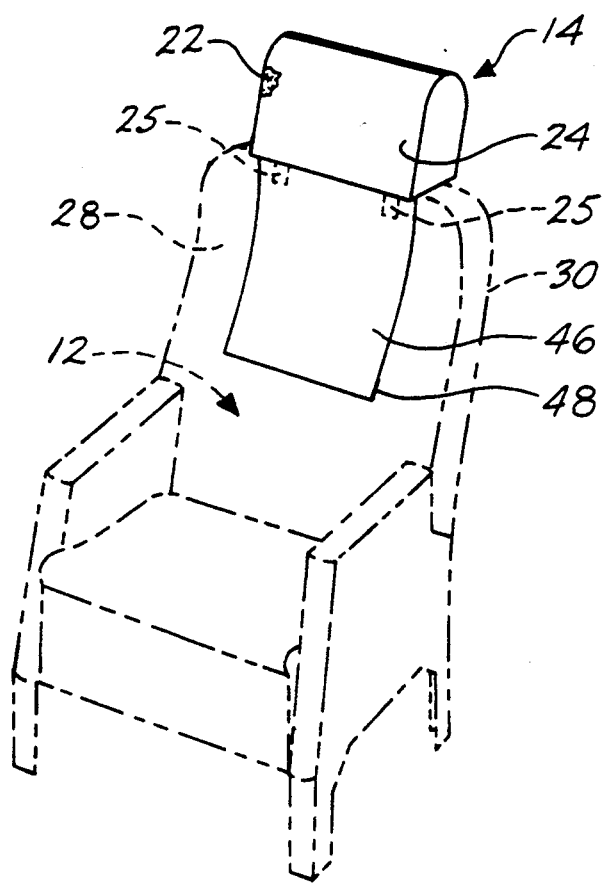
FIG. 1 provides a pictorial view of a detachable headrest constructed in accordance with the present invention, mounted on an aircraft seat back.
Figure 2:
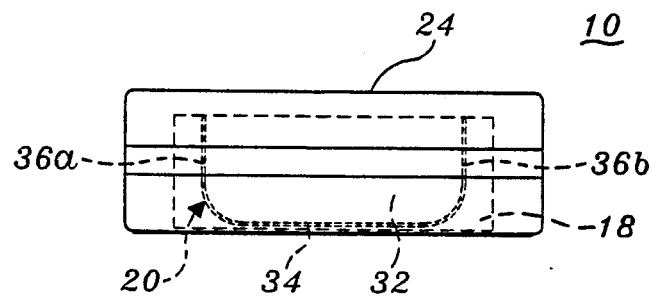
FIG. 2 provides a top plan view of the detachable headrest of FIG. 1, with the headrest base and collapsible upper frame portion shown in phantom view.

The present invention provides a detachable headrest 10, shown in FIG. 1, that is removably installable on a seat back 12, such as the back of a passenger airline seat. The headrest 10 includes a body 14 mounted above the top edge of the seat back 12. As shown in FIGS. 2 through 5, the body 14 of the headrest 10 includes a frame assembly 16 having a base member 18 for contacting the seat back 12 and a collapsible, resilient upper member 20 projecting upwardly from the base member 18, above the seat back 12. A cushion 22 is mounted on and supported by the upper member 20 of the frame assembly 16, and defines an anterior face 24 upon which a person's head rests. The headrest 10 is detachably secured to the seat back 12 by means of two U-shaped channel brackets 25 secured to the underside of the ends of the base member 18 with fasteners (not shown) or adhesive. Each channel bracket 25 includes two downwardly projecting, spaced-apart opposing flanges 26a and 26b, which grip the anterior side 28 and posterior side 30, respectively, of the upper edge of the seat back 12.

Figure 3:
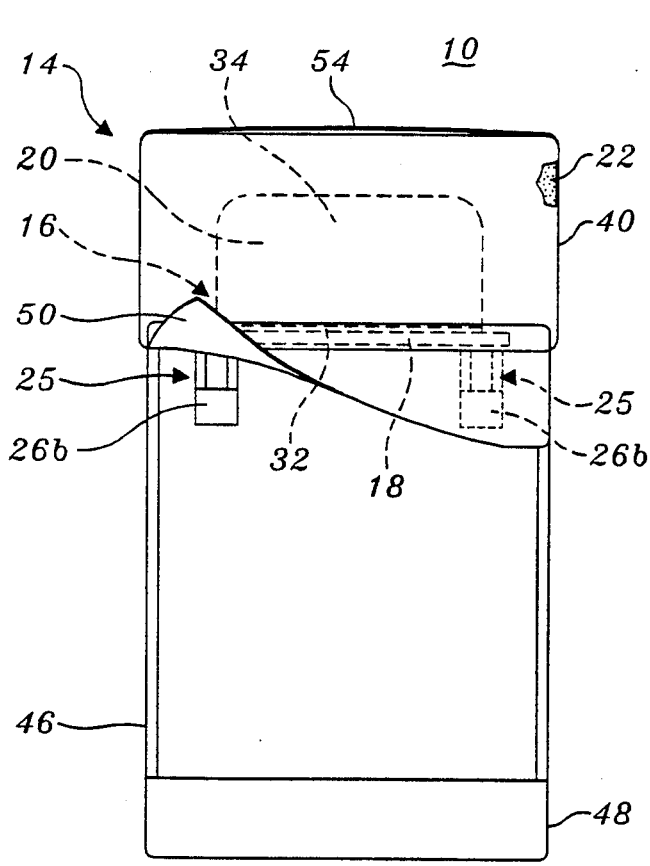
FIG. 3 provides a rear elevation view of the detachable headrest of FIG. 1, with the rear flap lifted to show a channel bracket, and the internal collapsible frame shown in phantom view.
Figure 4:
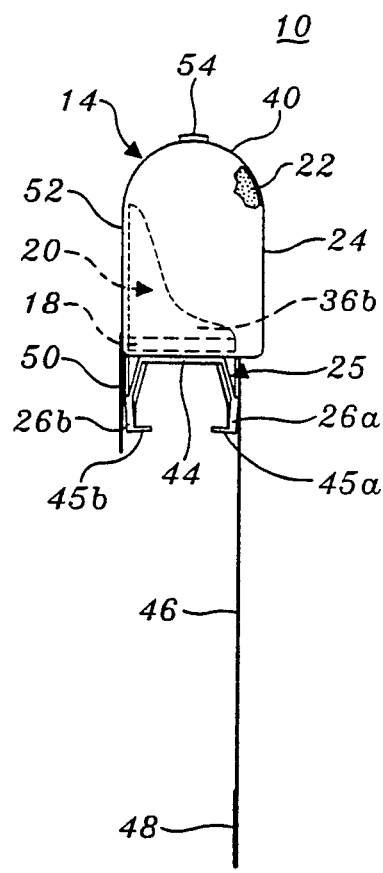
FIG. 4 provides a side elevation view of the detachable headrest of FIG. 1, with the internal frame shown in phantom view.
Figure 5:
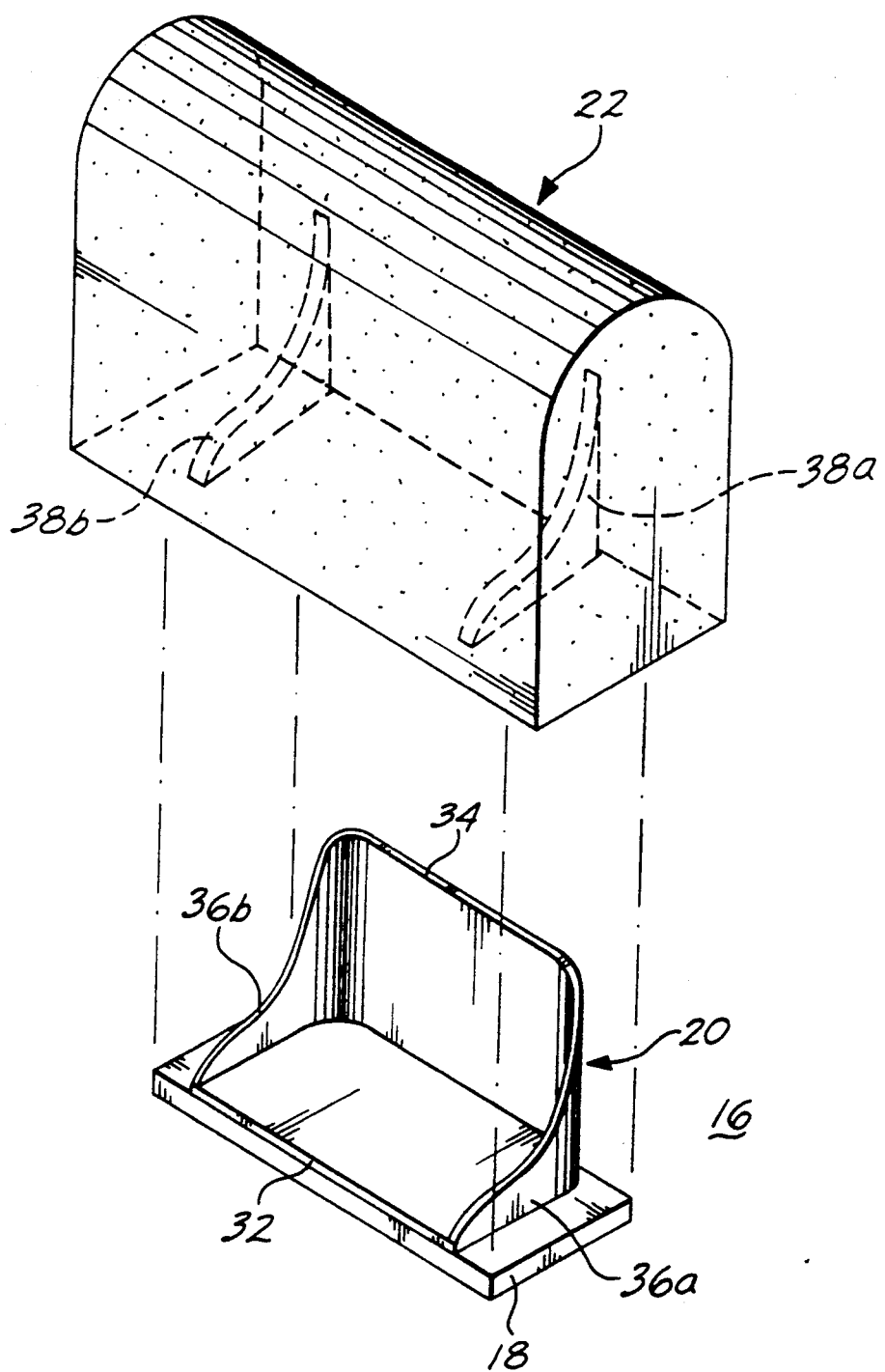
FIG. 5 provides a partially exploded perspective view of the frame and cushion of the detachable headrest of FIG. 1.

As shown in FIGS. 3, 4, and 5, the base member 18 of the frame assembly 16 is flat and rectilinear, and approximately the width of the upper edge of the seat back 12. The base member 18 may be formed of wood or of a lightweight metal such as aluminum, but is preferably formed of a plastic material such as a thermoplastic or reinforced thermosetting plastic.

The upper member 20 of the frame assembly 16 is illustrated as being secured to the upper surface of the base member 18, although it should be apparent to those of ordinary skill in the art that the upper member 20 and the base member 18 could be integrally formed as a one-piece unit, e.g., comprising an integral injection molded plastic assembly. The upper member 20 provides support for the head of a person using the seat and reclining against the headrest 10. Preferably, the upper member 20 of the frame is formed from a thin sheet of semi-rigid, resilient material. Suitable materials for the upper member 20 include semi-rigid, flexible thermoplastics, such as a polyolefin. The upper member 20 of the frame has a flat bottom section 32 that is fixedly secured (or formed integrally) to the upper surface of the base member 18. An upright center web section 34 projects upwardly from the posterior edge of the bottom section 32. The center web section 34 extends upwardly approximately two-thirds of the height of the headrest body 14 and has radiused upper corners.

Upright wing sections 36a and 36b project transversely forward from the ends of the center web section 34. The junctions between the wing sections 36a, 36b, and the center web section 34 are radiused. Each wing section 36a, 36b extends downwardly from the corresponding end edge of the center web section 34 to the corresponding edge of the bottom section 32. The wing sections 36a, 36b are parallel to each other and substantially perpendicular to the bottom section 32. The wing sections 36a and 36b taper in width from the point of their juncture with the bottom section 32 to the point of their juncture with the center web section 34. More particularly, the upper edge of each of the wing sections 36a and 36b transcribes a concave curve. The wings sections 36a and 36b serve to stiffen and stabilize the center web section 34 against transverse loads, such as those imposed by a user's head leaning against the headrest 10.

The headrest body 14 is given shape by the cushion 22 mounted to the base 18. The cushion 22 is mounted on top of the base member 18, and is partially received within the upper member 20. The cushion 22 is generally "loaf" shaped, having a flat bottom of greater width and length than the base 18, and an arcuate upper surface. To accommodate assembly of the cushion 22 with the base 18, first and second slots 38a and 38b are formed transversely to extend partially through the cushion 22 (FIG. 5). The slots 38a and 38b extend inwardly from the posterior side and upwardly from the bottom side of the cushion 22, and are contoured to substantially correspond to the shape of the wing sections 36a and 36b. The spacing between the slots 38a and 38b corresponds to the spacing between the wing sections 36a and 36b. The cushion 22 is inserted onto the frame 16, with the wing sections 36a and 36b being received within the corresponding slots 38a and 38b. The center section of the posterior face of the cushion 22 is thus received within the interior of the upper member 20 with the wing sections 36a and 36b encased by the cushion 22.

The cushion 22 is enclosed in a cover 40, shown in FIGS. 3 and 4. The cover 40 can be constructed of a cloth fabric, leather, or plastic film, but ideally is constructed from fabric that matches the type used to cover the seat on which the headrest is to be installed. The cover 40 encases the cushion 22 and is secured to the exposed edges of the base member 18 of the frame 16, thereby securing the cushion 22 to the frame 16 and providing for a satisfactorily durable exterior surface.

The upper member 20 of the frame is constructed from a collapsible, resilient, semi-rigid material. The cushion 22 is constructed from a compressible elastomeric foam material, such as foamed polyurethane. The upper member 20 of the frame 16 sufficiently stiffens the headrest body 14 so that when a user leans against the anterior face of the body 14, weight is transferred to the center web section 34 of the upper member 20 of the frame 16, which is stiffened by the wing sections 36a and 36b. Thus, when this transverse force is exerted on the headrest 10 by the user, adequate support is provided. However, if a person should fall down on top of the headrest 10, as may happen during air travel, the cushion 22 will compress, followed by a resilient collapse, or buckling, of the upper member 20 of the frame 16. This feature prevents injury to the person. As soon as the compressive top load is removed, the upper member 20 and cushion 22 spring back to their original configuration. Thus, the reversible deformability of the upper member 20 of the frame 16 ensure that the headrest 10 is ideally suitable for use on an aircraft.

In order to detachably mount the headrest 10 to the seat back 12, two channel brackets 25 are secured to the underside of the base member 18 of the frame 16. Each channel bracket 25 has a center portion 44 that is secured to the bottom of the base member 18 of the frame, and two downwardly depending, opposed flange portions 26a and 26b. Each of the channel brackets 25 thus has a generally upside-down U-shaped configuration.

The bottom tip of each of the flange portions 26a and 26b terminates in an inwardly projecting finger portion 45a or 45b, respectively. Ideally, the flange portions 26a and 26b are spaced apart a distance slightly less than the thickness of the seat back 12. To detachably install the headrest 10, the channel brackets 25 are spread slightly and inserted over the top edge of the seat back 12. The channel brackets 25 are formed of a strong resilient material that flexes slightly in order to accommodate the greater thickness of the seat back 12, and in turn slightly compress the seat back 12. The finger portions 45a and 45b further compress the underlying portions of the seat back 12, ensuring a firm grip. Suitable materials for construction of the channel brackets 25 include thermoplastic materials, such as acrylonitrilebutadienestyrene (ABS), or polyamide plastics. Rather than making the channel brackets 25 undersized in width, the flange portions 26a and 26b of the channel brackets 25 can instead be spring-biased inwardly, as will be readily apparent to those of ordinary skill in the art.

The channel brackets 25 are intended to mount the headrest 10 to the top of the seat back 12 in order to keep the headrest 10 from falling off when the headrest is not in use. In order to make the headrest 10 as small in height as possible, and to make installation easy, the depth of the channel brackets 25 is minimized. Preferably, the depth of the channel brackets 25 (i.e., height of the flange portions 26a and 26b) is less than six inches, and more preferably less than about four inches. The channel brackets 25 provide only part of the support that secures the headrest 10 against loads imparted on the headrest during use.

In order to secure the headrest 10 against transverse loads imparted on the headrest 10 during use, the headrest 10 includes a fabric flap 46 that depends downwardly from the headrest body 14, proximate the anterior face 24 of the body 14. The fabric flap 46 may be an extension of the cover 40, and is preferably firmly anchored to the anterior edge of the base member 18 of the frame 16. As used herein the term "fabric flap" is intended to encompass a web or strip of any strong, flexible material. Preferably, a textured woven fabric is used.

The flap 46 depends downwardly over the anterior face of the seat back 12, covering a substantial portion thereof. As shown in FIG. 1, the fabric flap 46 preferably extends at least halfway down the anterior face of the seat back 12. The exact length of the flap 46 will vary, depending on the height of the seat back 12, but is predetermined to allow sufficient frictional engagement between the anterior face of the seat back 12 and the back of a person sitting in the seat, to secure the headrest 10 in position.

A weight strip 48, such as a strip of plastic or paperboard, is preferably secured within a loop formed by the downward edge of the flap 46, thereby insuring that the flap 46 hangs smoothly. This strip 48 should be thin and flexible so as to avoid discomfort to the user of the seat.

A person sitting in the seat leans back against the seat back 12, thereby also leaning back against the fabric flap 46 and sandwiching the flap 46 between the user and the seat back 12. This sufficiently compresses the flap 46, and friction between the flap 46 and the seat back 12 prevents slidable motion of the flap 46 relative to the seat back 12. As the user bears against the anterior face 24 of the headrest 10, the headrest 10 is prevented from moving rearwardly off of the seat back 12 because of the restraint provided by the flap 46. Surprisingly, this frictional resistance alone has been found suitable to secure the headrest 10, with the channel brackets 25 being provided mainly to secure the headrest 10 when a person is not in the seat. This feature enables the channel bracket 25 to be of minimal size, as described above, and also avoids any modification to the seat back 12.

It should be apparent to those of skill in the art that the greater the force exerted by a user on the seat back 12, and thus on the headrest 10, the more tightly the material flap 46 is constrained against slidable movement. Thus, the headrest 10 is firmly anchored in place under varying conditions. When a person gets out of the seat, the flap 46 is no longer constrained, and the headrest 10 may be easily detached by lifting upwardly on the body 14.

As can be seen in FIG. 1, when the headrest 10 is installed, its anterior face 24 is substantially aligned with the anterior side 28 of the seat back 12. This prevents the user's head from being tilted uncomfortably forward or backward.

Referring to FIGS. 3 and 4, a cosmetic flap of cloth 50 preferably also depends downwardly from the posterior side 52 of the body portion 14, thereby covering the posterior flange portions 26b of the channel brackets 42. Additionally, a strip or handle 54 may be secured to the top surface of the body portion 14, to facilitate removal and handling of the detachable headrest 10.

When not in use, the material flap 46 may be wrapped around the detached headrest 10, and inserted underneath the handle 54, which spans fully across the top of the body portion 14. The headrest is thus compact and readily stored in a small space.

Although the above preferred embodiment of the headrest 10 has been described in the context of an aircraft seat headrest, for which it is ideally suited, it should be readily apparent to those of ordinary skill in the art that the headrest could also be used for other reclining seats, such as those in residences and offices, or in other vehicles, such as trains.

The collapsible upper member 20 of the frame described above is formed from a contoured sheet of semirigid material. Other configurations for an internal headrest frame that would withstand lateral loads, while collapsing under compressive loads, may be imagined by those of ordinary skill in the art. For example, spring-loaded vertical pistons could serve to support the cushion 22 in the lateral direction, while compressing under top loads.

The present invention has been described above in terms of a preferred embodiment and several variants thereof. Those of ordinary skill in the art will be able to make numerous other alterations, substitutions and modifications within the scope of the claims that follow. It is therefore intended that the scope of Letters Patent granted hereon be limited only by the appended claims.

The embodiments of the invention in which an exclusive property or privilege is claimed are defined as follows:

1. A detachable headrest mountable on a seat back, the seat back having an anterior side, a posterior side and a top surface defined therebetween, the headrest comprising:
   a frame having a base portion mountable to rest on the top surface of the seat back and a collapsible, resilient upper portion projecting upwardly from the base portion above the top surface of the seat back, the upper portion having a center web section extending upwardly from the base portion and first and second wing sections projecting transversely from first and second sides of the center web section, each wing section spanning between the center web section and the base portion;
   a cushion mounted on and supported by the upper portion of the frame and defining an anterior face upon which a person's head rests; and
   securement means for detachably securing the base portion of the frame to the seat back.

2. The detachable headrest of claim 1, wherein the upper portion of the frame is formed as a sheet that is contoured to define the center web section and first and second wing sections.

3. The detachable headrest of claim 1, wherein the wing sections of the upper portion of the frame taper in width upwardly from the base portion toward the top of the center web section.

4. The detachable headrest of claim 1, wherein the upper portion of the base is formed from a semi-rigid plastic material.

5. The detachable headrest of claim 1, wherein:
   the wing sections project forwardly from the center web section of the upper portion of the frame; and
   the cushion defines first and second vertical slots that receive the wing sections of the upper portion of the frame.

6. The detachable headrest of claim 1, wherein the securement means comprises:
   at least one set of spaced-apart first and second flanges that depend downwardly from the base portion of the frame for gripping the anterior and posterior sides, respectively, of the upper edge of the seat back, thereby detachably mounting the headrest on the seat back; and
   means for securing the headrest against transverse loads imposed on the anterior face of the cushion, thereby preventing the headrest from being pushed rearwardly off of the seat back.

7. The detachable headrest of claim 6, wherein the means for securing the headrest against lateral loads consists essentially of a fabric flap depending downwardly from the anterior face of the cushion to cover a portion of the anterior side of the seat back sufficiently that a person leaning against the seat back leans against the flap, thereby substantially preventing slidable movement of the flap relative to the seat back.

8. The detachable headrest of claim 7, wherein the securement means supports the frame and cushion directly above the seat back such that the anterior face of the headrest is substantially aligned with the anterior side of the seat back.

9. A detachable headrest mountable on a seat back, the seat back having an anterior side, a posterior side and a top surface defined therebetween, the headrest comprising:
   a base mountable to rest on the top surface of the seat back with posterior and anterior edges of the base dispersed proximate the posterior and anterior sides respectively, of the seat back;
   a semi-rigid upper frame projecting upwardly from the base above the top surface of the seat back, the upper frame having a center web section extending upwardly from proximate the posterior edge of the base, and at least a first stiffening section connected between an upper end of the center web section and a point proximate the anterior edge of the base, whereby the frame is capable of non-yieldably supporting a transverse load exerted by a person's head when the person reclines against the anterior side of the seat back and of reversibly collapsing under compressive loads exerted from above; and
   a bracket depending downwardly from the base and detachably securable to the seat back.

10. The detachable headrest of claim 9, wherein the upper frame is formed from a sheet that is contoured to define the center web section and first stiffening section.

11. The detachable headrest of claim 10, wherein the frame includes a second stiffening section, the first and second stiffening sections projecting transversely and downwardly from opposite sides of the center web section to the base.

12. The detachable headrest of claim 10, further comprising a deformable cushion secured to the anterior of the frame.

* * * * *